United States Patent
Kazmierczak et al.

(10) Patent No.: US 6,577,474 B2
(45) Date of Patent: Jun. 10, 2003

(54) INTEGRATED VOICE COIL MOTOR ASSEMBLY FOR A DISC DRIVE

(75) Inventors: Frederick Frank Kazmierczak, San Jose, CA (US); Michael Alan Maiers, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 118 days.

(21) Appl. No.: 09/726,366

(22) Filed: Nov. 29, 2000

(65) Prior Publication Data

US 2002/0063998 A1 May 30, 2002

Related U.S. Application Data

(60) Provisional application No. 60/181,170, filed on Feb. 9, 2000.

(51) Int. Cl.[7] .............................. G11B 21/08; G11B 5/55
(52) U.S. Cl. ............................................... 360/264.9
(58) Field of Search ..................... 360/264.9, 266.8, 360/266.4, 264.7, 264.3, 264.1, 264, 260, 240, 294.5, 266.7, 264.8, 97.02, 97.01

(56) References Cited

U.S. PATENT DOCUMENTS

| | | | |
|---|---|---|---|
| 5,109,310 A | 4/1992 | Ohkjita et al. ........... 360/264.3 |
| 5,262,912 A | 11/1993 | Hudson et al. .......... 360/256.2 |
| 5,315,464 A | 5/1994 | Tsujino .................... 360/99.08 |
| 5,315,466 A | * 5/1994 | Nishimoto et al. ...... 360/264.8 |
| 5,532,889 A | 7/1996 | Stefansky et al. ....... 360/97.01 |
| 5,636,091 A | 6/1997 | Asano ...................... 360/264.3 |
| 5,654,848 A | 8/1997 | Maiers et al. ............ 360/98.01 |
| 6,125,016 A | * 9/2000 | Lin ............................. 164/98 |
| 6,347,023 B1 | * 2/2002 | Suwa ...................... 360/264.8 |

* cited by examiner

Primary Examiner—Robert S. Tupper
Assistant Examiner—Julie Anne Watko
(74) Attorney, Agent, or Firm—Kirstin L. Stoll-DeBell; Merchant & Gould P.C.

(57) ABSTRACT

The present invention relates to a integrated voice coil motor assembly in a head disc assembly of a disc drive, the head disc assembly having a base plate and the top cover enclosing a data storage disc rotatably mounted on a drive motor, and an actuator arm for transferring data to and from the disc. The voice coil motor has a bottom pole attached to the base plate and a top pole integrated with the top cover. A permanent magnet set is positioned between the bottom pole and a top cover and generates a magnetic field between the bottom pole and the top cover. The top pole rests within a recess in an outer surface of the top cover above the bottom pole and provides a return path for the magnetic field generated by the permanent magnet set. A voice coil is attached to the actuator arm and positioned within the magnetic field between the bottom pole and the top cover.

12 Claims, 5 Drawing Sheets

INTEGRATED VOICE COIL MOTOR ASSEMBLY FOR A DISC DRIVE

RELATED APPLICATIONS

This application claims priority of United States provisional application Ser. No. 60/181,170, filed Feb. 9, 2000.

FIELD OF THE INVENTION

This application relates generally to magnetic disc drives and more particularly to a voice coil motor assembly that is partially integrated with the top cover of a disc drive.

BACKGROUND OF THE INVENTION

Disc drives are data storage devices that store digital data in magnetic form on a rotating storage medium, such as a disc. Modern disc drives include a head disc assembly comprising one or more rigid discs that are coated with a magnetizable medium and mounted on the hub of a drive motor for rotation at a constant high speed. Disc drive components within the head disc assembly, such as the hub of the drive motor, a flex assembly, and a voice coil motor, are mounted to a base plate. A top cover mounts on the base plate to internally seal the head disc assembly. Information is stored on the discs in a plurality of concentric circular tracks typically by an array of transducers ("heads") mounted to a radial actuator arm (E-block) for movement of the heads relative to the discs. The read/write transducer, e.g. a magneto resistive read/write head, is used to transfer data between a desired track and an external environment. During a write operation, data is written onto the disc track and during a read operation the head senses the data previously written on the disc track and transfers the information to the external environment.

The actuators employ a voice coil motor assembly to position the heads with respect to the disc surfaces. The voice coil motor assembly includes a coil and a magnetic circuit comprising one or more permanent magnet sets and magnetically permeable pole pieces. The coil is mounted on the side of the actuator arm opposite the head arms so as to be immersed in the magnetic field of the magnetic circuit. When controlled direct current (DC) is passed through the coil, an electromagnetic field is set up which interacts with the magnetic field of the magnetic circuit to cause the coil to move in accordance with the well-known Lorentz relationship. As the coil moves, the actuator body pivots about the pivot shaft and the heads move across the disc surfaces.

The heads are mounted via flexures at the ends of a plurality of actuator arms that project radially outward from the actuator body. The actuator body pivots about a bearing assembly mounted on the base plate at a position closely adjacent to the outer extreme of the discs. The head(s) read data and transfer it along the actuator arm to a preamplifier that amplifies the signals coming from the heads.

Typically, a magnetically permeable bottom pole is mounted to the base plate and a magnetically permeable top pole is mounted to the base plate via standoffs in spaced relation to the bottom pole and the top cover. The top pole is mounted such that it forms an air gap between the top pole and the top cover. At least one permanent magnet set is positioned between the two poles and attached to either pole. The coil is positioned between the magnet set and the opposite pole.

FIG. 1 shows a head disc assembly of a conventional disc drive 100. The disc drive 100 includes a base plate 102 to which various components of the disc drive 100 are mounted. A top cover 104, shown partially cut away, cooperates with the base 102 to form an internal, sealed environment for the disc drive 100 in a conventional manner. The components include a drive motor 106 which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

During a seek operation, the track position of the heads 118 is controlled through the use of a voice coil motor (VCM) assembly 120, which typically includes a coil 126 attached to the actuator arm 114, a top pole 122, a bottom pole 124 (shown in FIG. 2), and one or more permanent magnet sets 128 having a pair of magnets 129 and 131 with opposite polarity lying in a common plane which establish a magnetic field in which the coil 126 is immersed. The magnet could also be (rather than two pieces) a single part with a transition zone between the two faces of opposite polarity. The top pole 122 is attached in spaced relation to the bottom pole 124 with magnetically permeable standoffs 150. The controlled application of current to the coil 126 causes magnetic interaction between the permanent magnet sets 128 and the coil 126 so that the coil 126 moves in accordance with the well known Lorentz relationship. The top pole 122 and the bottom pole 124 provide a return path for the magnetic field passing through the coil 126. As the coil 126 moves, the actuator assembly 110 pivots about the bearing shaft assembly 112, and the heads 118 are caused to move across the surfaces of the discs 108.

FIG. 2 shows a sectional view of a conventional voice coil motor 120 along line 2-2 of FIG. 1. The bottom pole 124 is mounted to the base plate 102 by any conventional method, such as screws or adhesive. The top pole 122 is mounted to the base plate 102 via standoffs (not shown) such that the top pole 122 is spaced apart from the bottom pole 124. The top pole 122 and the top cover 104 typically form an air gap 123 therebetween. A permanent magnet set 128 is attached to the top pole 122 opposite the top cover 104. The coil 126 is attached to the actuator assembly (not shown) and positioned between the magnet set 128 and the bottom pole 124. An air gap 125 is formed between the magnet set 128 and the coil 126. Another air gap 127 is formed between the coil 126 and the bottom pole 124. One of the problems with this conventional design is that the overall height and size of the disc drive is increased because of the extra space created by the air gap 123. In order to eliminate the air gap 123, the top pole 122 must be adjacent to the top cover 104 and the magnet set 128. A second problem with this conventional design is that it requires unnecessary parts, such as standoffs 150, to mount the top pole 122 within the head disc assembly.

However, this conventional voice coil motor design has several potential areas for improvement. First, this design wastes space because the air gap between the top cover and the top pole is not required in order for the voice coil motor to function. One way to eliminate the air gap would be to mount the top pole directly to an inside surface of the top cover with an adhesive. However, adhesives may cause outgasing that can corrupt normal disc drive operation. A second way to eliminate the air gap would be to weld the top pole directly to the top cover, providing the two parts (cover and pole) are of similar materials and are able to be welded. The problem with welding is that the potential exists for a gap to form between the two parts. The gap may allow contaminates to be trapped and possibly escape to the interior of the head disc assembly. Contaminants that can be trapped even from a cleaning process. Another way to eliminate the air gap and save space is to create a recess in the top cover with an opening into the head disc assembly. The top pole is then mounted to an outside surface of the top cover and the magnet set is inserted into the head disc assembly via the opening in the recess. While this approach saves space by eliminating the air gap between the top pole and the top cover, the opening breaks the seal between the top cover and the base plate thereby increasing the possibility of contamination within the head disc assembly.

A second problem with the conventional voice coil motor design is that it is relatively expensive to manufacture. First, it employs a number of separate parts, such as the standoffs used to mount the top pole, that must be assembled. Second, the poles must be plated to prevent corrosion within the head disc assembly.

Accordingly there is a need for a voice coil motor assembly that saves space but does not corrupt the normal operation of the disc drive. Additionally, there is a need to reduce the manufacturing costs of voice coil motors by eliminating unnecessary parts and manufacturing steps.

SUMMARY OF THE INVENTION

Against this backdrop the present invention has been developed. The present invention comprises a voice coil motor assembly in a head disc assembly of a disc drive that is integrated with the top cover of the disc drive thereby reducing the overall size of the disc drive and reducing manufacturing costs associated with the disc drive.

The head disc assembly has a base plate and a top cover enclosing a data storage disc rotatably mounted on a drive motor mounted to the base plate and an actuator arm for transferring data to and from the disc. The voice coil motor comprises a bottom pole, a permanent magnet set, a top pole, and a coil. The bottom pole is attached to the base plate. The permanent magnet set includes a pair of magnets with opposite polarity faces lying in a common plane between the bottom pole and the top cover. The magnet set generates a magnetic field between the bottom pole and the top cover. The top pole rests within a recess in an outer surface of the top cover above the bottom pole and provides a return path for the magnetic field generated by the permanent magnet set. Finally, the voice coil is attached to the actuator arm and positioned within the magnetic field between the bottom pole and the top cover. A second permanent magnet set may be added on an opposite side of the coil from the other permanent magnet set.

These and various other features as well as advantages which characterize the present invention will be apparent from a reading of the following detailed description and a review of the associated drawings.

DETAILED DESCRIPTION

Figure 1:
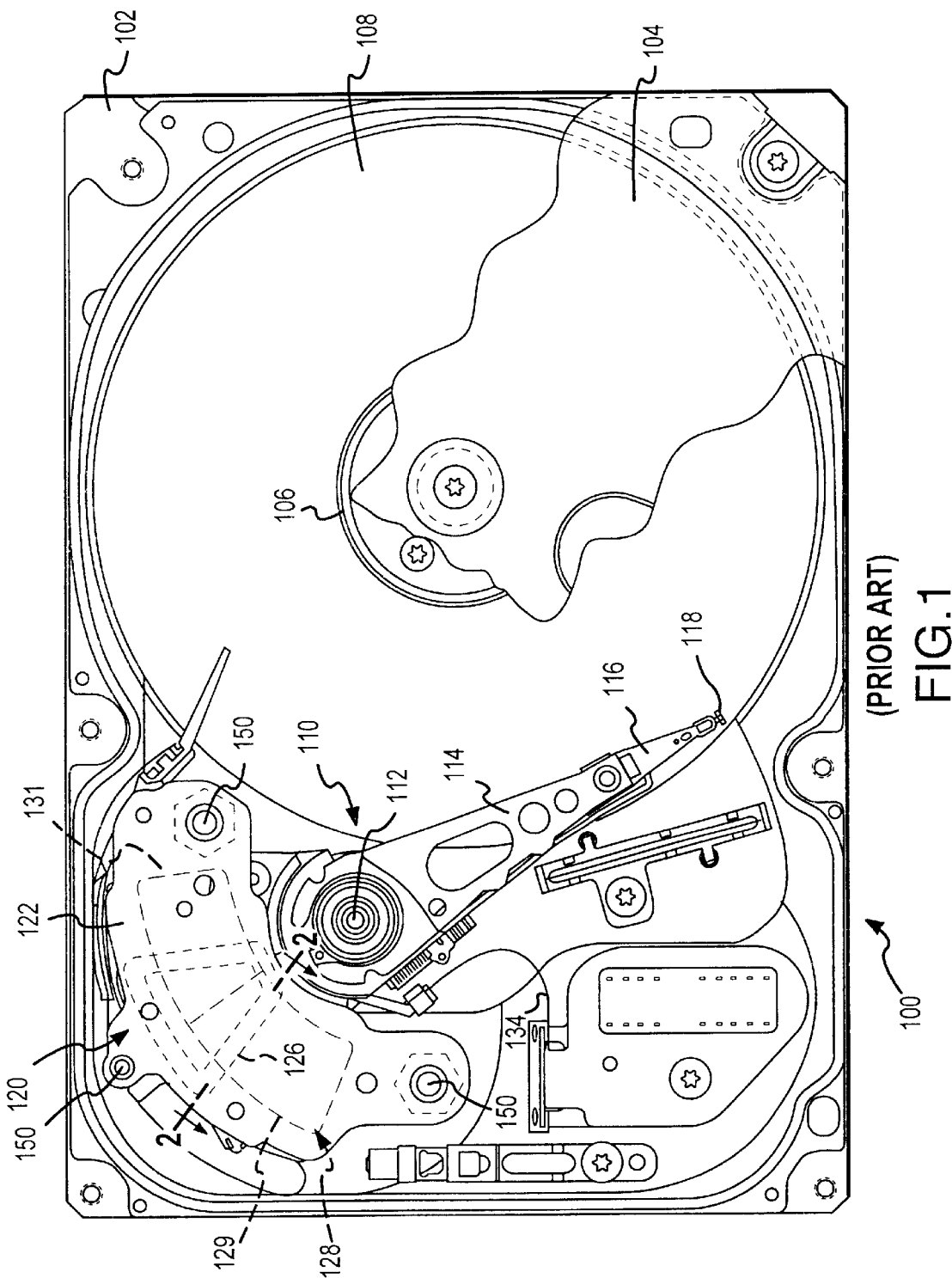
FIG. 1 is a plan view of a disc drive showing the primary internal components and incorporating a conventional voice coil motor.
Figure 2:
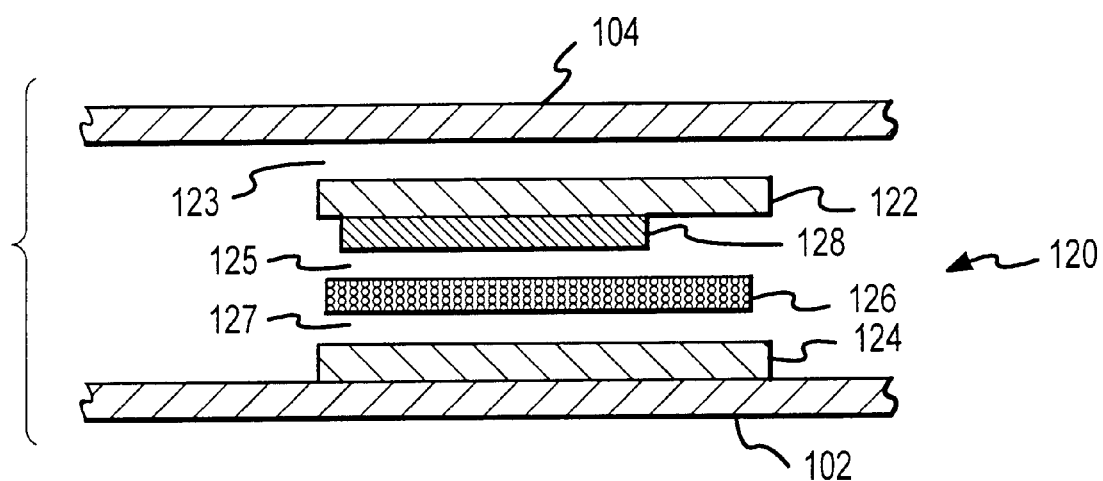
FIG. 2 is a cross section view taken along the line 2—2 of FIG. 1 showing a prior art voice coil motor assembly.
Figure 3:
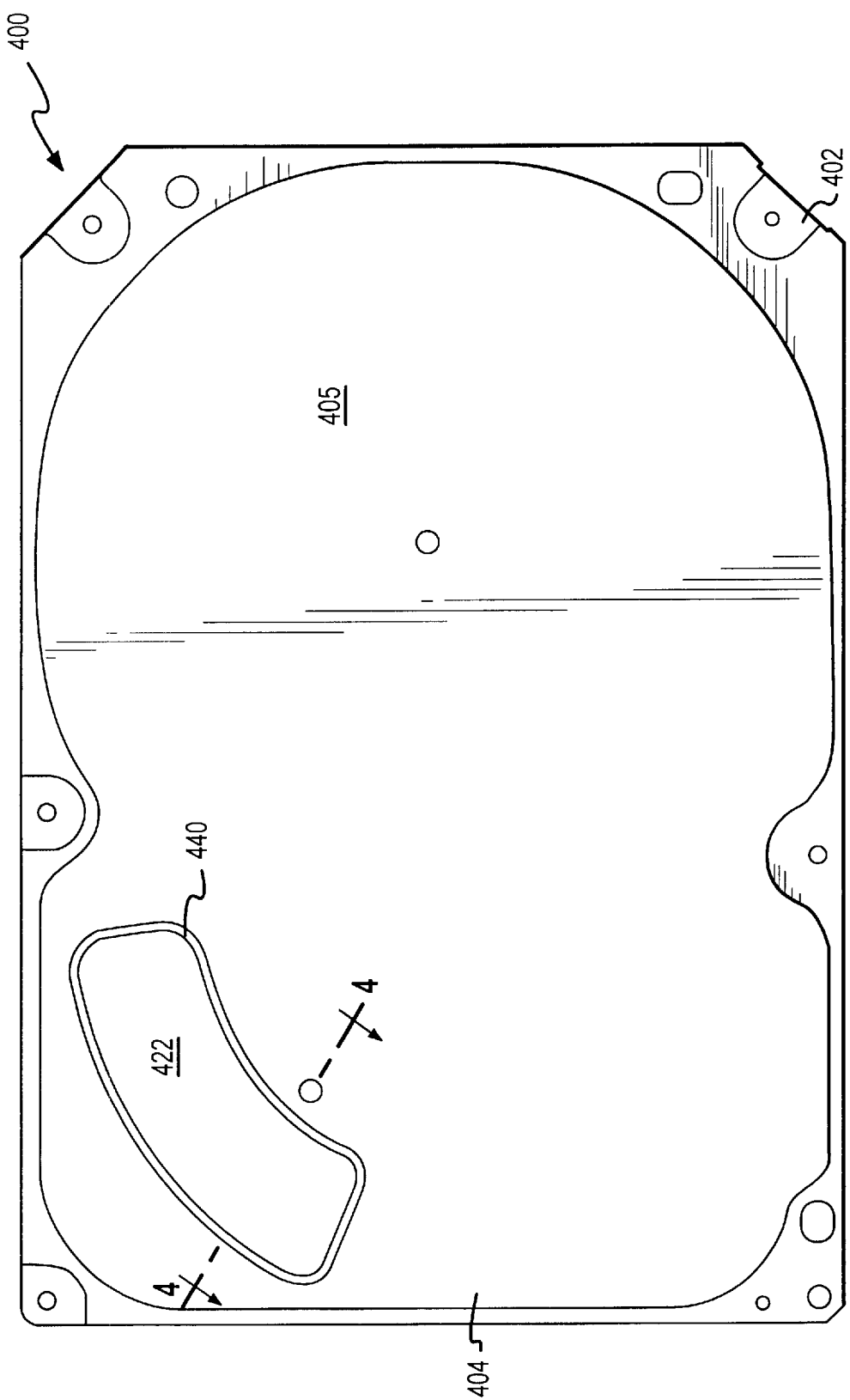
FIG. 3 is a top plan view of a disc drive with a voice coil motor partially integrated with the top cover in accordance with a preferred embodiment of the present invention.

A preferred embodiment of the present invention is shown in FIG. 3. Disc drive 400 incorporates an integrated voice coil motor assembly 420 (shown in FIG. 4). Similar to the disc drive 100, the disc drive 400 includes a base plate 402, disc drive components (not 30 shown), such as an actuator assembly adjacent a data disc mounted on a drive motor mounted to the base plate 402, and a top cover 404 connected to the base plate 402. The top cover 404 cooperates with the base plate 402 to form an internal, sealed environment (HDA) for the disc drive 400 in a conventional manner. Top cover 404 has an outer surface 405 that forms a recess 440 sized to accommodate a top pole 422. The recess 440 may be any size and shape so long as the recess 440 is of a complementary size and shape to the top pole 422 so that it can fit within the recess 440. For example, the recess 440 may have a flat bottom arcuate shape.

Figure 4:
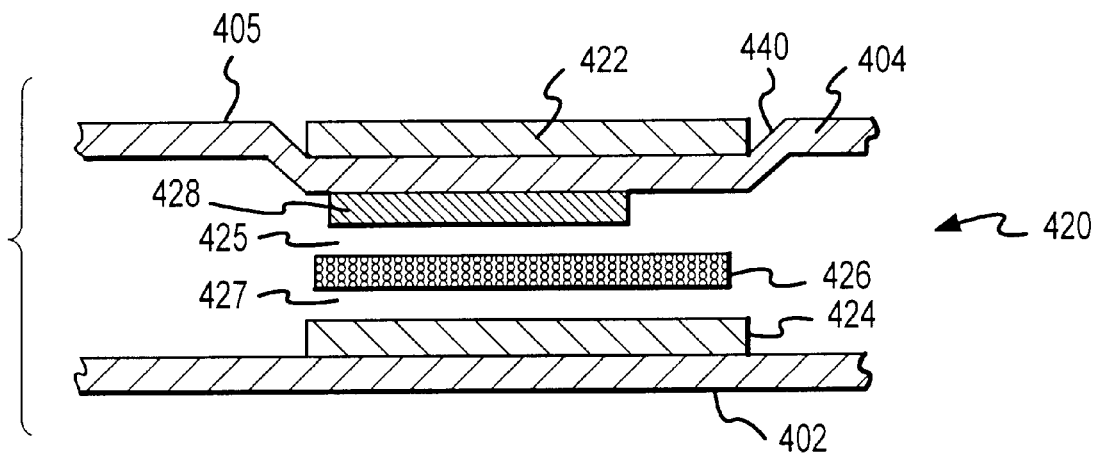
FIG. 4 is a sectional view taken along line 4—4 of FIG. 3 showing a voice coil motor assembly incorporating a preferred embodiment of the present invention.

FIG. 4 is a cross sectional view of the disc drive 400 taken along lines 4—4 of FIG. 3. The recess 440 has a depth equal to the thickness of the top pole 422 such that the upper surface of the top pole 422 is flush with the outer surface 405 of the top cover 404 when the top pole 422 is placed within the recess 440. A magnet set 428 having a pair of magnets with opposite polarity faces lying in a common plane attached on an opposite (inner) surface of the top cover 404 from the top pole 422 via its own magnetic force or by a suitable adhesive. A bottom pole 424 is attached to the base plate 402 by any conventional manner. A coil 426 is positioned between the magnet set 428 and the bottom pole 424.

Attaching the top pole 422 to the outer surface 405 of the top cover 404 provides the following advantages over the prior art. First, it eliminates an unnecessary air gap between the top pole 422 and the top cover 404 permitting the overall drive 400 to be thinner. Second, attaching the top pole 422 on the outside of the top cover 404 permits the use of an adhesive for attachment, if needed, without causing any outgasing problems within the disc drive 400. Third, since the top pole 422 is located outside of the HDA of the disc drive 400, the top pole 422 does not need to be plated which reduces manufacturing costs. Fourth, since the top pole 422 is mounted directly to the top cover 404, the standoffs 150 are eliminated thus further reducing the number of parts and thereby reducing manufacturing costs of the disc drive 400. Finally, the recess 440 allows the top pole 422 to rest flush with the outer surface 405 of the top cover 404 thereby keeping the height of the disc drive 400 uniform.

Figure 5:
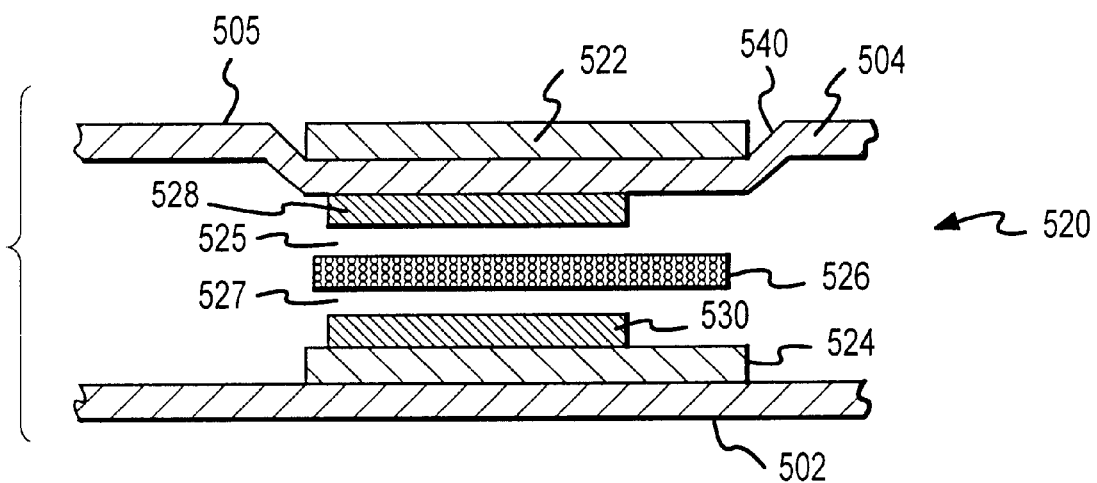
FIG. 5 is a sectional view of a voice coil motor assembly in accordance with another preferred embodiment of the present invention.

FIG. 5 shows another alternative embodiment incorporating a voice coil motor 520 of the present invention in a disc drive 500. Similar to disc drive 400, the HDA of the disc drive 500 has a recess 540 in its top cover 504. A top pole 522 is positioned within the recess 540 and may be attached to an outer surface 505 of the top cover 504 by an adhesive or other conventional attachment means. A permanent magnet set 528 is attached to an opposite (inner) surface of the top cover 504 from the top pole 522. The voice coil motor 520 has a second permanent magnet set 530 attached to a bottom pole 524 which is attached to a base plate 502. Although two magnet sets will increase the overall size of the disc drive 500, the additional magnet set 530 increases the efficiency of the voice coil motor 520. Recess 540 is sized to receive top pole 522 and it is deep enough so that the upper surface of the top pole 522 will be flush with the outer surface 505.

Figure 6:
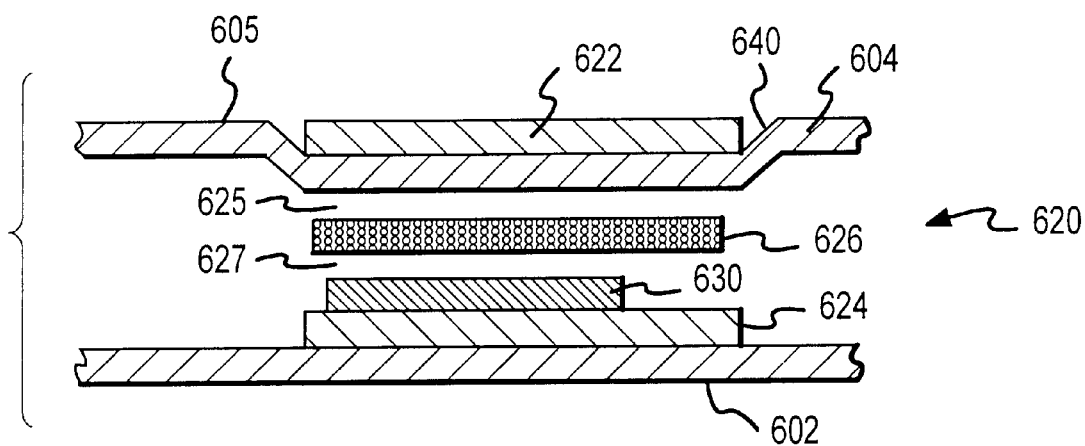
FIG. 6 is a sectional view a voice coil motor assembly in accordance with yet another preferred embodiment of the present invention.

FIG. 6 shows another alternative embodiment of the present invention incorporating a voice coil motor 620 in a disc drive 600. Similar to disc drive 400, the disc drive 600 has a recess 640 in its top cover 604. A top pole 622 is positioned within the recess 640. The top pole 622 is attached to an outer surface 605 in the recess 640 of the top cover 604 by an adhesive or other conventional attachment means. A bottom pole 624 is attached to a base plate 602. However, instead of having a magnet set attached to an opposite (inner) surface of the top cover 604 from the top pole 622, the voice coil motor 620 has a single magnet set 630 attached to upper surface of the bottom pole 624.

In summary, the present invention may be viewed as a voice coil motor assembly (such as 420, 520, or 620) in a head disc assembly of a disc drive (such as 400, 500, or 600). The head disc assembly has a base plate (such as 402, 502, or 602) and a top cover (such as 404, 504, or 604) enclosing a data storage disc (such as 108) rotatably mounted on a drive motor (such as 106), and an actuator arm (such as 114) for transferring data to and from the disc (such as 108). The voice coil motor (such as 420, 520, or 620) has a bottom pole (such as 424, 524, or 624) attached to the base plate (such as 402, 502, or 602). A permanent magnet set (such as 428, 528, 530, or 628) includes a pair of magnets (such as 129 and 131) with opposite polarity faces that lie in a common plane between the bottom pole (such as 424, 524, or 624) and the top cover (such as 404, 504, or 604) for generating a magnetic field between the bottom pole (such as 424, 524, or 624) and the top cover (such as 404, 504, or 604). A top pole (such as 422, 522, or 622) is located within a recess (such as 440, 540, or 640) in an outer surface (such as 405, 505, or 605) of the top cover (such as 404, 504, or 604) above the bottom pole (such as 424, 524, or 624). The top pole (such as 422, 522, or 622) provides a return path for the magnetic field generated by the permanent magnet set (such as 428, 528, 530, or 628). The recess (such as 440, 540, or 640) may have a flat bottom arcuate shape. A voice coil (such as 426, 526, or 626) is attached to the actuator arm (such as 114) and positioned adjacent the permanent magnet set (such as 428, 528, 530, or 628) within the magnetic field between the bottom pole (such as 424, 524, or 624) and the top cover (such as 404, 504, or 604). The permanent magnet set (such as 428, 528, 530, or 628) may be fastened to the bottom pole (such as 424, 524, or 624) or the top cover (such as 404, 504, or 604). Additionally, the voice coil motor assembly (such as 420, 520, or 620) may have another permanent magnet set (such as 428, 528, 530, or 628) having opposite polarity faces lying in a common plane and fastened to an inner surface of the top cover (such as 404, 504, or 604) beneath the top pole (such as 422, 522, or 622).

Stated another way, the present invention may be viewed as a disc drive (such as 400, 500, or 600) that has a base plate (such as 402, 502, or 602), a top cover (such as 404, 504, or 604) attached to the base plate (such as 402, 502, or 602) enclosing a digital data storage disc (such as 108) rotatably mounted on a drive motor (such as 106), and an actuator arm (such as 114) mounted adjacent the disc (such as 108) for selectively positioning a transducer over the disc (such as 108), and a voice coil motor (such as 420, 520, or 620). The voice coil motor (such as 420, 520, or 620) has a voice coil (such as 426, 526, or 626) attached to the actuator arm (such as 114), a bottom pole (such as 424, 524, or 624) mounted to the base plate (such as 402, 502, or 602), a top pole (such as 422, 522, or 622) attached within a recess (such as 440, 540, or 640) in an outer surface (such as 405, 505, or 605) of the top cover (such as 404, 504, or 604), and a permanent magnet set (such as 428, 528, 530, or 628) between the poles. The permanent magnet set (such as 428, 528, 530, or 628) has a pair of magnets (such as 129 and 131) with opposite polarity faces lying in a common plane between the poles. The coil (such as 426, 526, or 626) is positioned adjacent to the permanent magnet set (such as 428, 528, 530, or 628) between the poles. The permanent magnet set (such as 428, 528, 530, or 628) may be fastened to the bottom pole (such as 424, 524, or 624) or the top cover (such as 404, 504, or 604). The recess (such as 440, 540, or 640) may have a flat bottom arcuate shape. Additionally, the voice coil motor assembly (such as 420, 520, or 620) may have another permanent magnet set (such as 428, 528, 530, or 628) having opposite polarity faces lying in a common plane and fastened to an inner surface of the top cover (such as 404, 504, or 604) beneath the top pole (such as 422, 522, or 622).

It will be clear that the present invention is well adapted to attain the ends and advantages mentioned as well as those inherent therein. While presently preferred embodiments have been described for purposes of this disclosure, various changes and modifications may be made which are well within the scope of the present invention. For example, the size and shape of the recess may vary so long as the recess is able to receive insertion of the top pole. Additionally, a second recess may be included in the base plate for insertion of the bottom pole in the manner described herein. Numerous other changes may be made which will readily suggest themselves to those skilled in the art and which are encompassed in the spirit of the invention disclosed and as defined in the appended claims.

What is claimed is:

1. A voice coil motor assembly in a head disc assembly of a disc drive, the head disc assembly having a base plate and a top cover enclosing a data storage disc rotatably mounted on a drive motor, and an actuator arm for transferring data to and from the disc; the voice coil motor comprising:

a bottom pole attached to the base plate;

a permanent magnet set including a pair of magnets with opposite polarity faces lying in a common plane between the bottom pole and the top cover for generating a magnetic field between the bottom pole and the top cover;

a top pole connected to an outer surface within a recessed region of the top cover above the bottom pole for providing a return path for the magnetic field generated by the permanent magnet set, wherein the outer surface does not have an opening therethrough; and a voice coil attached to the actuator arm and positioned within the magnetic field between the bottom pole and the top cover.

2. The voice coil motor assembly according to claim 1 wherein the permanent magnet set is fastened to the bottom pole.

3. The voice coil motor assembly according to claim 1 wherein the permanent magnet set is fastened to the top cover.

4. The voice coil motor assembly according to claim 1 wherein the recess has a flat bottom arcuate shape.

5. The voice coil motor assembly according to claim 4 wherein the permanent magnet set is fastened to the bottom pole.

6. The voice coil motor assembly according to claim 5 further comprising another permanent magnet set having opposite polarity faces lying in a common plane and fastened to an inner surface of the top cover beneath the top pole.

7. A disc drive comprising:

a base plate;

a top cover attached to the base plate enclosing a digital data storage disc rotatably mounted on a drive motor and an actuator arm mounted adjacent the disc for selectively positioning a transducer over the disc, the top cover having a recess defining an outer surface without an opening therethrough; and a voice coil motor having a voice coil attached to the actuator arm, a bottom pole mounted to the base plate, a top pole attached within the outer surface of the recess in the top cover, and a permanent magnet set between the poles having a pair of magnets with opposite polarity faces lying in a common plane between the poles, wherein the coil is positioned adjacent to the permanent magnet set between the poles.

8. The disc drive according to claim 7 wherein the permanent magnet set is fastened to the bottom pole.

9. The voice coil motor assembly according to claim 7 wherein the permanent magnet set is fastened to the top cover.

10. The voice coil motor assembly according to claim 7 wherein the recess has a flat bottom arcuate shape.

11. The voice coil motor assembly according to claim 10 wherein the permanent magnet set is fastened to the bottom pole.

12. The voice coil motor assembly according to claim 11 further comprising another permanent magnet set having opposite polarity faces lying in a common plane and fastened to an inner surface of the top cover beneath the top pole.

* * * * *